United States Patent [19] [11] 4,393,403
Geis et al. [45] Jul. 12, 1983

[54] ROTATING DIAPHRAGM FOR A DYNAMIC PICK-UP DEVICE HAVING A PYROELECTRIC LAYER

[75] Inventors: Hans P. Geis; Holger Helber, both of Bremen, Fed. Rep. of Germany

[73] Assignee: U.S. Philips Corporation, New York, N.Y.

[21] Appl. No.: 267,215

[22] Filed: May 26, 1981

[30] Foreign Application Priority Data

Sep. 18, 1980 [DE] Fed. Rep. of Germany ....... 3035240

[51] Int. Cl.³ .............................................. H04N 5/33
[52] U.S. Cl. .................................. 358/113; 250/233; 250/333
[58] Field of Search ................ 358/113, 202; 250/330, 250/332, 333, 334, 338, 233, 511, 232

[56] References Cited

U.S. PATENT DOCUMENTS 3,352,156 11/1967 Beitz .................................... 250/233
4,227,210 10/1980 Nixon .................................. 358/113
4,322,620 3/1982 Steinhage ........................... 250/333

FOREIGN PATENT DOCUMENTS 1551520 8/1979 United Kingdom .

Primary Examiner—Joseph A. Orsino, Jr.
Attorney, Agent, or Firm—Marc D. Schechter

[57] ABSTRACT

By rotating a diaphragm in front of a pickup device, for example a pyroelectric vidicon, eddy currents are generated in the diaphragm if the diaphragm is made of a metal. These eddy currents are generated as a result of the interaction between the moving diaphragm and the magnetic field of the deflection coils of the vidicon. If the diaphragm is instead made of an insulating material, separation of charges occurs on it as a result electrostatic generation, due to the interaction between the diaphragm and the electrostatic field of the vidicon. Compensation of the charge separation causes interference in the video signal. According to the invention a diaphragm of an insulating material is used which is covered with a pattern of electrically conductive tracks or a very high resistance layer. As a result of this no eddy currents and no noteworthy electrostatic charges can occur, so that an interference-free video signal is obtained.

8 Claims, 2 Drawing Figures

ROTATING DIAPHRAGM FOR A DYNAMIC PICK-UP DEVICE HAVING A PYROELECTRIC LAYER

BACKGROUND OF THE INVENTION

The invention relates to a rotating diaphragm for a dynamic pick-up device having a pyroelectric layer. The diaphragm rotates about an axis and periodically interrupts the thermal radiation which is incident on the pyroelectric layer. Moreover, the diaphragm comprises an electrically insulating material and a poorly conducting material.

Such a diaphragm is known from German Offenlegungsschrift Nos. 2731653 and 2731654 (corresponding to U.K. Pat. No. 1,551,520 and U.S. Pat. No. 4,227,210, respectively). Such a diaphragm may be used in dynamic pick-up devices such as pyroelectric vidicons and infrared detectors.

In order to obtain a signal with such a pickup device, for example a pyroelectric vidicon, a thermally varying picture must be incident on the pyroelectric layer. This varying picture can be obtained, inter alia, by repeatedly opening and closing a diaphragm which is situated between the observed object and the pyroelectric layer. Such a diaphragm, sometimes called a "chopper," is generally constructed as a rotating disk or cone which preferably has spiral-like parts.

Such diaphragms, when rotating immediately in front of the vidicon, however, cause interference in the video signal. The interference is caused by magnetic and electric interactions. In diaphragms consisting of insulating material, for example epoxy resin, electrostatic generation is produced due to the interaction with an electrostatic field which is always present. Processes to compensate for charges separated in this manner induce peak-shaped interference signals in the video signal. In diaphragms made of metal, eddy currents occur due to the interaction with the magnetostatic field of the focusing coil of the vidicon. The eddy currents produce magnetic fields which react on the vidicon to produce interference.

Several possible solutions have already been investigated to prevent such interference, for example the provision of a network of copper before the pyroelectric layer or an extra grounded germanium window in vidicons. On the one hand these measures are expensive, and on the other hand they are not always effective to the desired extent.

SUMMARY OF THE INVENTION

It is an object of the invention to provide a rotating diaphragm of a simple construction which generates no interference in the video signal of a dynamic pickup device. According to the invention this is achieved by providing the diaphragm with an electrically conductive cover layer in which substantially no eddy currents are generated. The cover layer consists of (i) a pattern of electrically conductive conductor tracks which are connected together and to a reference potential, or (ii) a very high resistance layer having a sheet resistance between $5.10^4$ and $10^6$ Ohm, which resistive layer is connected to a reference potential.

By means of such a pattern of conductor tracks or a resistive layer eddy currents are prevented or repressed, since the conductor tracks can be made sufficiently narrow and the resistive layer has a sufficiently high resistance. On the other hand, by providing a corresponding distance between the conductor tracks, the parts of the diaphragm which are not covered can be made small so that only a low voltage is built up by charge separation. This either does not cause any compensation at all, or any compensation caused results in substantially no noticeable interference.

The pattern of conductor tracks can be constructed in various manners. In an efficacious embodiment of the invention, the conductor tracks extend substantially radially and are connected to a sliding contact via the shaft of the rotating diaphragm. By means of such a pattern, interference can be effectively prevented.

When a diaphragm is used having spiral-like parts, at least a few of the radially extending conductor tracks are bent along the circumference of the diaphragm and extend in the spiral-like parts of the diaphragm.

DESCRIPTION OF THE PREFERRED EMBODIMENTS

Figure 1:
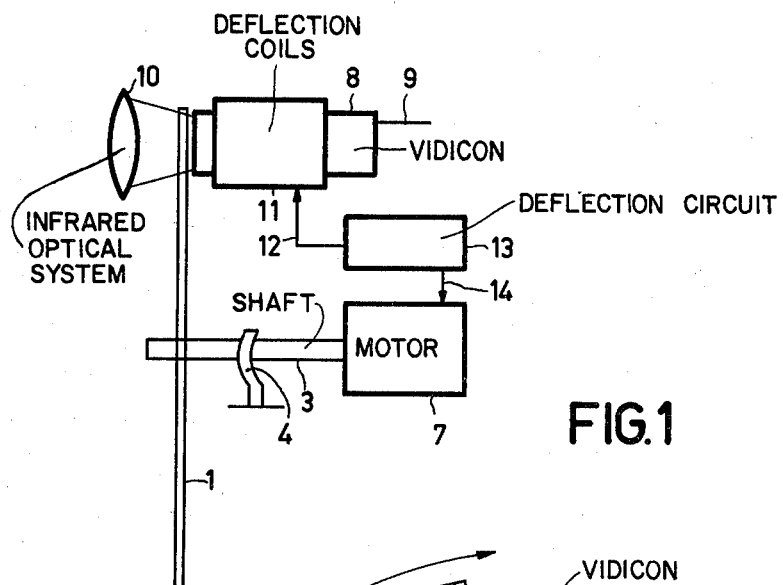
FIG. 1 is a part schematic and part side elevational of a vidicon and a rotating diaphragm which according to the invention.

In FIG. 1 the diaphragm 1 is connected to a shaft 3 which is driven at constant speed by a motor 7. The shaft 3 is alternately connected to a reference potential and ground via a sliding contact 4.

A pyroelectric vidicon 8 is provided opposite the edge of the diaphragm 1 in such manner that the axis of vidicon 8 extends parallel to the axis of the diaphragm 1 and the shaft 3. Via an infrared optical system 10 a thermographic record is displayed on the pyroelectric layer of the vidicon 8. As in a vidicon for visible light, the pyroelectric layer of vidicon 8 is scanned with an electron beam along a frame. The scanning is controlled by deflection coils 11. The deflection coils 11 are controlled via the line 12 by the deflection circuit 13. Circuit 13 also synchronizes the motor 7 via the line 14 so that scanning occurs synchronously with rotation of the diaphram 1. By scanning the pyroelectric layer with the electron beam a video signal is obtained which can be derived from the output 9 of the vidicon 8.

Figure 2:
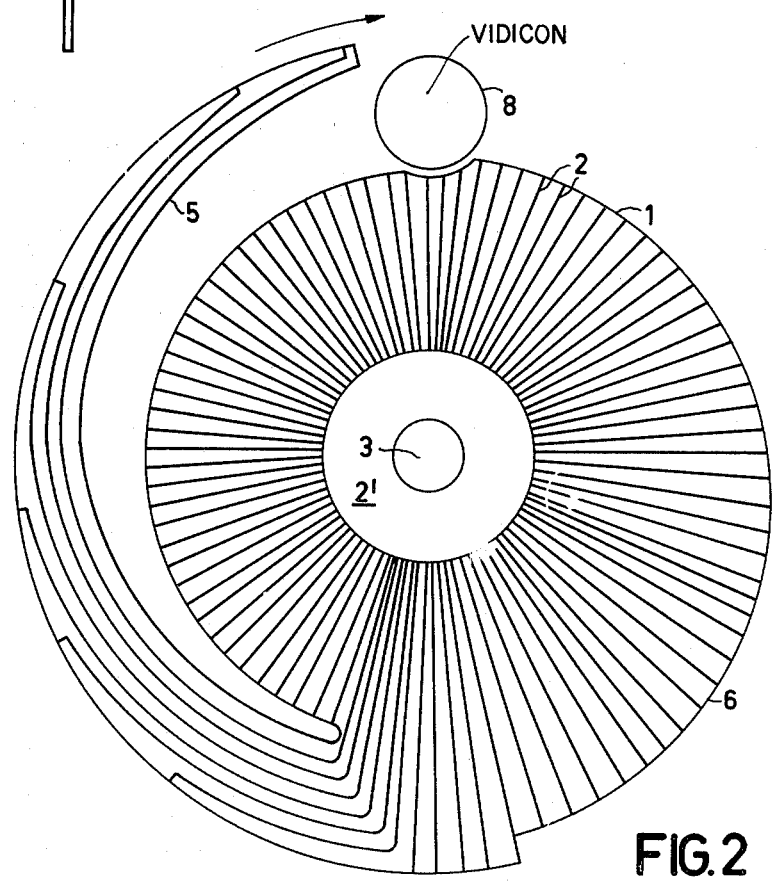
FIG. 2 is a plan view of a full-size diaphragm according to the invention.

FIG. 2 is a plan view, on a scale of 1:1, of the diaphragm 1 in front of vidicon 8. This diaphragm comprises a part 5 of which the inner side extends in the form of a spiral towards the center of the diaphragm. The opposite side of part 5 extends at a uniform distance from the center point. The side 6 of the disk-shaped diaphragm 1 also extends in the form of a spiral with respect to the center.

Upon rotation of the diaphragm 1 in the direction of the arrow shown near the vidicon 8 in FIG. 2, first the upper edge of the vidicon is covered. As a result of this an abrupt temperature change is obtained on the uppermost part of the pyroelectric layer of the vidicon 8. This temperature change generates in the vidicon 8 a maximum video signal at the output due to the synchronisation of the rotation of the diaphragm 1 with the scanning electron beam.

After half a rotation of the diaphragm 1 the vidicon 8 is just covered fully and the scanning has just come up to the lower edge. Upon further rotation of the diaphragm 1 the vidicon 8 is exposed again from the upper edge by the spiral-like side 6 so that an abrupt temperature change is again produced, which is then immediately scanned by the electron beam.

The magnetic field generated by the deflection coils and the focusing coil 11 in FIG. 1 would generate eddy currents, and hence oppositely directed magnetic fields, in diaphragm 1 if it were made of metal. As a consequence, the scanning with the electron beam would be adversely influenced. Since, however, for the scanning with the electron beam an electric field is also necessary, charges would be formed on the diaphragm 1, if it were instead made of insulating material, by electrostatic generation. In compensation processes, these charges would simulate signals and picture elements of the thermographic record which are not present.

The diaphragm shown in FIG. 2 is covered with a pattern of conductor tracks 2 extending radially and connected in the center to a conductive surface 2'. Surface 2' is in turn is conductively connected to the shaft 3. In the area of the diaphragm where the spiral-like side of part 5 is present, a few conductor tracks extend along the circumference of the diaphragm. These circumferential tracks are connected to radially extending conductor tracks. As a result of this a pattern of conductor tracks is obtained between which only narrow regions remain on which no large or interfering electric charges can be formed.

On the other hand the conductor tracks themselves are only very narrow so that no significant eddy currents can be formed in them, so that no magnetic fields can be formed which adversely influence the scanning with the electron beam in the vidicon.

The pattern of conductor tracks 2 on the diaphragm 1 may also be constructed differently, so long as the noncovered areas of the diaphragm 1 are narrow and small, and the conductor tracks 2 form no closed current circuits in which eddy current can be induced. The manufacture of the diaphragm can be in the same manner as the manufacture of patterns of conductor tracks on printed circuits, namely by selectively etching away a continuous copper layer on a plate of insulating material. The copper plate can be selectively etched by covering it with photolacquer, and exposing the photolacquer via a mask according to the desired pattern of conductor tracks.

It is also possible to cover the diaphragm shown in FIG. 2 with a very high resistance layer. Such a high resistance layer can be manufactured from metal oxides, for example, ferrites, tin oxide, vanadium oxide, chromium oxide, manganese oxide, and iron oxide. Lead sulphide and soots of mixtures of all these substances may also be used. A layer of approximately 50 $\mu$m thick provided by dipping and consisting of approximately 40% by weight of polyvinyl acetate and 60% by weight of zinc-manganese-ferrite has a sheet resistance of $10^5$ ohm and proves to prevent disturbances.

It will be obvious that the invention may also be used in conical diaphragms as shown in the published German Application No. 2731653, discussed above.

What is claimed is:

1. A rotating diaphragm for a pickup device having a pyroelectric target, in operation said diaphragm rotating about an axis and periodically interrupting thermal radiation which is incident on the pyroelectric target, characterized in that said diaphragm comprises:
   an electrically insulating material; and
   a layer of electrically conductive material on the electrically insulating material, said electrically conductive layer being in the form of a pattern of electrically conductive tracks in which substantially no eddy currents are generated on rotation of the diaphragm in a magnetic field.

2. A rotating diaphragm as claimed in claim 1, characterized in that in operation all of the conductive tracks are connected to a single reference potential.

3. A rotating diaphragm as claimed in claim 2, characterized in that:
   the diaphragm is disc-shaped;
   the conductive tracks are arranged in a radial pattern; and
   the diaphragm has an electrically conductive shaft which is electrically connected to each conductive track.

4. A rotating diaphragm as claimed in claim 3, characterized in that the pickup device is a pyroelectric vidicon.

5. A rotating diaphragm for a pickup device having a pyroelectric target, in operation said diaphragm rotating about an axis and periodically interrupting thermal radiation which is incident on the pyroelectric target, characterized in that said diaphragm comprises:
   an electrically insulating material; and
   a layer of a material having a high electrical resistance provided on the electrically insulating material, said resistive material having a sheet resistance of between $5 \times 10^4$ and $10^6$ ohms.

6. A rotating diaphragm as claimed in claim 5, characterized in that in operation the resistive material is connected to a reference potential.

7. A rotating diaphragm as claimed in claim 6, characterized in that the resistive material has a sheet resistance of approximately $10^5$ ohms.

8. A rotating diaphragm as claimed in claim 7, characterized in that the pickup device is a pyroelectric vidicon.

* * * * *